(12) United States Patent
Tsai et al.

(10) Patent No.: US 6,561,420 B1
(45) Date of Patent: May 13, 2003

(54) INFORMATION CARD SYSTEM

(76) Inventors: Erica Tsai, 15100 El Camino Grande, Saratoga, CA (US) 95070; John C. Tsai, 15100 El Camino Grande, Saratoga, CA (US) 95070

( * ) Notice: Subject to any disclaimer, the term of this patent is extended or adjusted under 35 U.S.C. 154(b) by 23 days.

(21) Appl. No.: 09/835,961

(22) Filed: Apr. 10, 2001

Related U.S. Application Data

(60) Provisional application No. 60/241,569, filed on Oct. 18, 2000.

(51) Int. Cl.[7] .................................................. G06K 7/08
(52) U.S. Cl. ........................ 235/449; 235/380; 235/379; 235/493
(58) Field of Search ................................. 235/449, 380, 235/379, 493; 360/137

(56) References Cited

U.S. PATENT DOCUMENTS

| | | | | |
|---|---|---|---|---|
| 4,774,618 A | * | 9/1988 | Raviv ........................... | 360/133 |
| 4,868,373 A | * | 9/1989 | Opheij et al. ................ | 235/380 |
| 4,945,219 A | | 7/1990 | Tanaka | |
| 5,107,099 A | | 4/1992 | Smith | |
| 5,173,594 A | * | 12/1992 | McClure ...................... | 235/375 |
| 5,227,212 A | * | 7/1993 | Ahlert et al. ................ | 360/135 |
| 5,412,192 A | | 5/1995 | Hoss | |
| 5,493,105 A | * | 2/1996 | Desai ........................... | 235/375 |
| 5,844,757 A | | 12/1998 | Rose | |
| 5,864,125 A | | 1/1999 | Szabo | |
| 5,895,909 A | * | 4/1999 | Yoshida ....................... | 235/487 |
| 5,929,414 A | | 7/1999 | Saitoh | |
| 5,942,744 A | | 8/1999 | Kamo et al. | |
| 6,011,677 A | * | 1/2000 | Rose ............................ | 360/131 |
| 6,015,093 A | | 1/2000 | Barrett et al. | |
| 6,021,030 A | * | 2/2000 | Weinberger et al. ........ | 360/133 |
| 6,042,009 A | | 3/2000 | Barrett et al. | |
| 6,134,082 A | * | 10/2000 | Uwabo et al. ............... | 360/133 |
| 6,169,890 B1 | * | 1/2001 | Vatanen ................... | 379/357.01 |
| 6,179,209 B1 | * | 1/2001 | Goodwin et al. ........... | 235/483 |
| 6,307,709 B1 | * | 10/2001 | Liu et al. ..................... | 360/131 |
| 6,336,104 B1 | * | 1/2002 | Walker et al. ................. | 705/26 |
| 6,340,117 B1 | * | 1/2002 | Eisele et al. ................. | 235/382 |
| 6,370,241 B1 | * | 4/2002 | Clark ........................... | 340/7.1 |
| 6,385,407 B1 | * | 5/2002 | Inose .................... | 222/DIG. 1 |
| 6,405,126 B1 | * | 6/2002 | Palomo et al. .............. | 340/990 |

FOREIGN PATENT DOCUMENTS

JP           09106656 A   *  10/1995

OTHER PUBLICATIONS

International Search Report, Aug. 21, 2002, Patent Cooperation Treaty ISA/US, In re International App. No. PCT/US02/09381.

* cited by examiner

Primary Examiner—Karl D. Frech
Assistant Examiner—Daniel I Walsh
(74) Attorney, Agent, or Firm—Raymond E. Roberts; Intellectual Property Law Offices

(57) ABSTRACT

A data distribution system (10) including an information card (12) and a reader (14). The information card (12) includes visible indicia (20) on its front and stripe zones (34) and a ring zone (36) on its back. The zones (34, 36) are suitable for magnetically recording data, and optional data identifiers. The reader (14) may be a linear reader (14a) or a rotary reader (14b), and optionally may act automatically in response to reading a data identifier. If the reader (14) is a rotary reader (14b) the information card (12) may be loaded into a cartridge (16) which is loaded into the rotary reader (14b).

14 Claims, 4 Drawing Sheets

INFORMATION CARD SYSTEM

This application claims the benefit of application Ser. No. 60/241,659, filed Oct. 18, 2000.

TECHNICAL FIELD

The present invention relates generally to dynamic magnetic information storage or retrieval, and more particularly to a specific record carrier structure wherein the record is operationally in the form of a disk.

BACKGROUND ART

The business or calling card has a long history and is widespread in almost all modem society today. Such cards contain human visible indicia on a front face, and are typically blank or contain a small amount of additional visible indicia one the back face. These cards have, however, proven quite cost effective even for distributing the small amount of data which they can carry. They are typically made of inexpensive paper or plastic material to begin with, and their manufacture, typically by printing and cutting from larger stock is also notably inexpensive. In use, these cards are easily stored, transported, and distributed in bulk. When they are received, individually, all of this prompts their recipients to store those cards considered important and otherwise readily dispose of them.

Unfortunately, the business or calling card has not evolved as modem society has. Today we use machines to assist us by collecting, storing, categorizing, acting on data, and deleting it when finished with it. It would be nice if the business or calling card could be used by our machines for this, particularly by electronic and computerized devices like personal computers, cellular telephones, and navigation systems, but viable systems for this have yet to appear. This can be appreciated by examining some examples of attempts to modernized the business or calling card.

U.S. Pat. No. 4,945,219 by Tanaka teaches a calling card with visible data on one side and magnetically encoded data in stripes on another side. The encoded data in the card is read by passing (linearly) the card through a reader. As such, this prior art does not teach or suggest encoding data which can be read rotationally, adding identifiers to facilitate use of the encoded data, or the reader being able to automatically or particularly act on specific types of the encoded data.

U.S. Pat. No. 5,493,105 by Desai teaches a business card system with printed data on one side and encoded data in a magnetic stripe on another side. The encoded data in the card is read by passing (linearly) the card through a reader, and the reader may be coupled to a computer control system (e.g., a conventional personal computer) able to automatically act on some types of the encoded data. As such, this prior art does not teach or suggest encoding data which can be read rotationally.

U.S. Pat. No. 5,107,099 by Smith teaches a memory card system with encoded data in a magnetizable layer on one side (provision for printed data is apparently not contemplated). The memory card is read by rotating the card in a large assembly relative to an external fixed reference. A specialized tray may be used for mounting the memory card into a readout apparatus. As such, this prior art does not teach or suggest visible data, encoding data which can be read linearly, encoding data which can be read rotationally (wherein the card is rotated about an axis there through), or the reader being able to automatically or particularly act on specific types of the encoded data.

U.S. Pat. No. 4,477618 by Ravi teaches a business card system with printed indicia on one side and data in a magnetic strip on another side. The magnetic strip may be rectangular, for linear reading, or may be curvilinear to permit mounting the business card on a sheet which in turn, is mounted in a floppy diskette carrier that is inserted into a conventional 5¼" floppy disk drive to read the card. Accordingly, card here also is read by rotation in a large assembly relative to an fixed reference external to the card itself. As such, this prior art does not teach or suggest encoding data which can be read rotationally (wherein the card is rotated about an axis there through), or the reader being able to automatically or particularly act on specific types of the encoded data.

U.S. Pat. No. 5,844,757 and 6,011,677 by Rose teach data storage cards and an adapter to read the cards (rotationally) in a personal computer floppy disk drive. Visible data may appear on one side of the card and magnetically encoded data on another side. Single or dual openings enable the card to be engaged within the adapter, aligned, and rotated for reading. As such, this prior art does not teach or suggest encoding data which can be read linearly, or the reader being able to automatically or particularly act on specific types of the encoded data. It also depends on the use of its openings in the card, which are unconventional in business and calling cards, and particularly tends to interfere with the visible data if such were present in its conventional location.

U.S. Pat. No. 5,942,744 by Kamo et al. teaches a magnetic (and optical) card system encoded data in arcs (or regions read as arcs) on one side. Printed or visible data is apparently not mentioned, but reference to the card as a replacement for prior.art business and credit cards suggests such is contemplated. This card is intended for use in a specialized, dual-head unit. While the dual read heads do rotate about axes passing through the card, neither axis is centered with respect to the card. As such, this prior art does not teach or suggest encoding data which can be read linearly, or the reader being able to automatically or particularly act on specific types of the encoded data. The mechanism necessary for reading the card is also quite unconventional, as can readily be appreciated by the figures in this reference.

U.S. Pat. No. 5,864,125 by Szabo teaches a data input card including a picture or text field, miniature map segments (images), and bar-coded data which provides coordinates of a destination point. The card is electro-optically read by insertion into a slot in a global positioning system (GPS) device, which presents one of the miniature map segments (images having different map scales are taught) on a display and which instructs a user, visibly or audibly, how to reach the destination point based on the bar-coded data and a current position determined with the GPS device. As such, this prior art does not teach or suggest magnetic encoding, or reading data rotationally. In particular, the GPS device is also unconventional when the optical map segment viewer, bar code reader, and audio capabilities are provided.

In sum, none of the known prior art combines both linear and true (about a central card axis) rotational read capability. This art, generally, also contemplates using either simple linear, swipe motion type readers or complex linear or curvilinear motion type readers which will not work in modem 3.5" form factor assemblies desired in equipment such as today's personal computers. Furthermore, the awkwardness of even the present linear motion type systems is emphasized by the fact that common devices, like cellular telephones and personal digital assistants (PDAs) have not incorporated small, cheap linear type read heads. To the extent that the known prior art does provide any ability to automatically act on data, such is accomplished with unconventional and expensive equipment. Accordingly, the benefits of the ubiquitous business or calling card have yet to be effectively and economically realized in our modern, mechanized society and a more suitable information card system is needed.

DISCLOSURE OF INVENTION

Accordingly, it is an object of the present invention to provide a system for distributing data which is, at least in part, visually readable by human users and also, at least in part machine readable.

Another object of the invention is to provide such a system for distributing data which substitutes for or expands upon the role of the conventional business or calling card.

Another object of the invention is to provide such a system which may employ a both linear and rotary type machine readers.

And another object of the invention is to provide such a system which may employ a disposable media for storing the data being distributed.

Briefly, one preferred embodiment of the present invention is a system for distributing data. The system includes an information card which resembles a conventional business card. The information card has visually-recognizable indicia on its front surface, in the manner of conventional business cards, and it has at least one stripe zone and a ring zone on its said back surface. At least one of these zones is suitable for magnetically recording the data. The stripe zones are aligned parallel with opposed edges of the information card and are readable with respect to the data recorded therein by passing the information card through a linear read mechanism. The ring zone is centered about a central axis through the information card and is readable with respect to the data recorded therein by passing said information card through a rotational read mechanism. A reader for reading the data magnetically recorded in the information card is further provided, wherein the reader contains a linear read mechanism or a rotational read mechanism.

Briefly, a second preferred embodiment of the present invention is an information card for distributing data, such as the information card described for the first preferred embodiment, above.

Briefly, a third preferred embodiment of the present invention is a mounting cartridge for mounting an information card, such as the information card described for the first preferred embodiment, above, when the reader is a conventional floppy disk drive having a read head and a spindle with a central axis. The mounting cartridge includes a bottom cover, a top cover, a hinge connecting the covers in a clamshell-like manner, and a latch for manually locking the covers together to contain the information card inside the mounting cartridge. When closed, the mounting cartridge has dimensions equivalent to a conventional diskette cartridge as commonly used in the floppy disk drive. The mounting cartridge further includes a hub which is centrally and rotatably mounted in the bottom cover. The hub has an upper side which is flat and substantially coplanar with the covers when the mounting cartridge is closed. The hub also has a lower side shaped to engage with the spindle of the floppy disk drive when the mounting cartridge is loaded into the floppy disk drive. The top cover includes a centrally located rotatable unit against which the information card is pressably held by the hub when it is engaged by the spindle of the floppy disk drive. And the bottom cover includes a port permitting access by the read head of the floppy disk drive to the data magnetically stored in the ring zone of the information card when the mounting cartridge with the information card is loaded into the floppy disk drive.

An advantage of the present invention is that it provides a system for distributing data in manners which are visually readable by human users and also magnetically readable by both linear and rotary type reading machines.

Another advantage of the invention is that its media, an "information card," may be chosen to resemble conventional business or calling cards, with visually readable indicia for human users on one side and magnetically recorded data on another side. The information card may also be constructed largely of similar materials as conventional business or calling cards, making the information cards easy and inexpensive to manufacture, and encouraging their ready and wide distribution. Those receiving the information card may simply dispose of them as they see fit.

Another advantage of the invention is that the data which is stored magnetically may be stored with data identifiers, so that the reader may store the data or act automatically with respect to it when reading such a data identifier.

Another advantage of the invention is that the magnetically stored data may be stored in multiple manners. For example, multiple machine readable formats can be supported and the data can be stored in multiple languages.

Another advantage of the invention is it may employ popular and widely available mechanisms for reading the data being distributed. The information card media can be swiped linearly through a linear reader. Many linear readers are already in use, and adding such to systems like cellular phones and personal digital assistants (PDAs) is quite feasible because of the potential small size and low cost of linear reader mechanisms. Alternately, the information card media can be rotated in the manner of a disk in a rotary reader. Many rotary readers are also already in use, such as the very common example of removable disk drive units in personal computers.

And another advantage of the invention is that the information card can be mounted in a cartridge which, in turn, is mounted in a conventional floppy disk drive to read the information card.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 2b is a bottom plan view of the information card of FIG. 2a;

In the various figures of the drawings, like references are used to denote like or similar elements or steps.

BEST MODE FOR CARRYING OUT THE INVENTION

Figure 1:
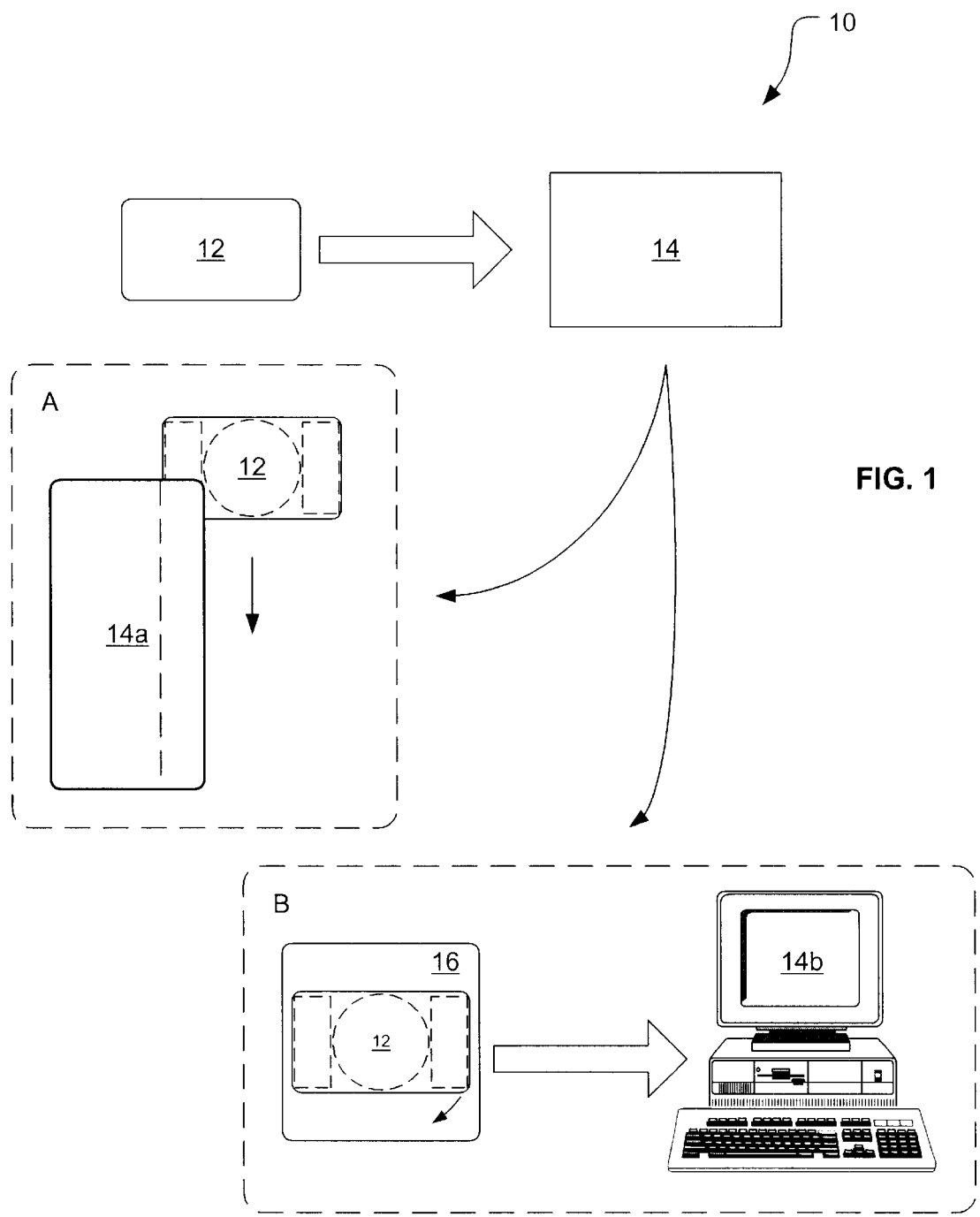
FIG. 1 is a block diagram stylistically depicting the major elements of the invention.

A preferred embodiment of the present invention is a system for distributing data. As illustrated in the various drawings herein, and particularly in the view of FIG. 1, a preferred embodiment of the invention is depicted by the general reference character 10.

FIG. 1 is a block diagram depicting the major elements of the invention. As presented therein, the data distribution system 10 generally employs an information card 12 and a reader 14 for reading data magnetically stored on the information card 12. The reader 14 may read data by moving the information card 12 linearly as depicted by insert A in FIG. 1. When this is the case, the reader 14 is herein termed a linear reader 14a. Alternately, the reader 14 may read data by rotating the information card 12 as depicted by insert B in FIG. 1. When this is the case, the reader 14 is herein termed a rotary reader 14b. To read the data rotationally in the rotary reader 14b, the information card 12 is first mounted into a cartridge 16 which is loaded into the rotary reader 14b.

Figure 2A:
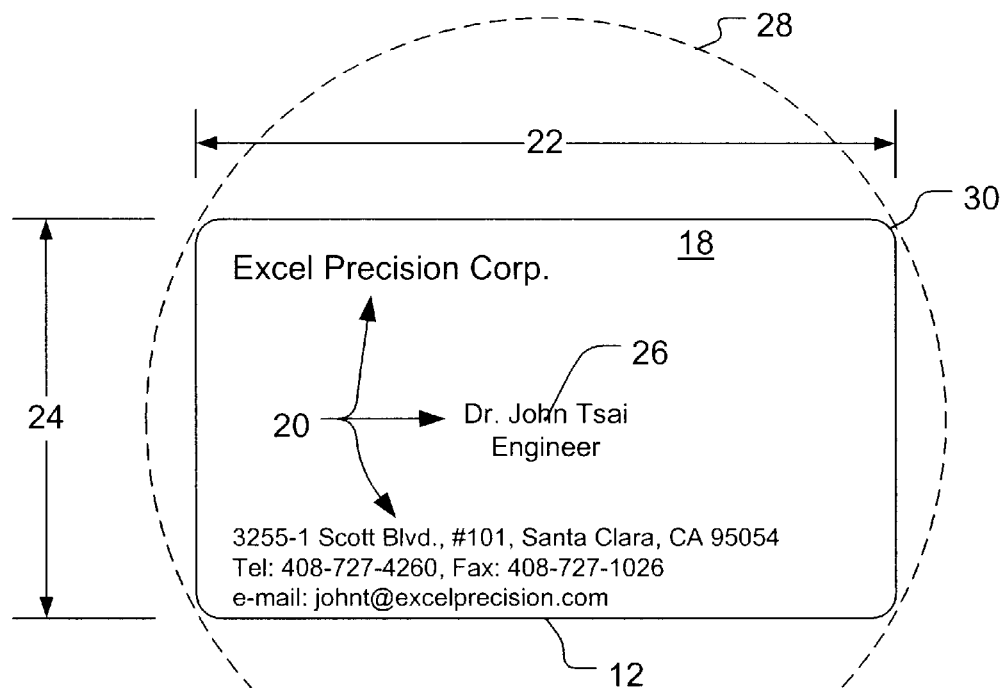
FIG. 2a is a top plan view of an information card according to the present invention.
Figure 2B:
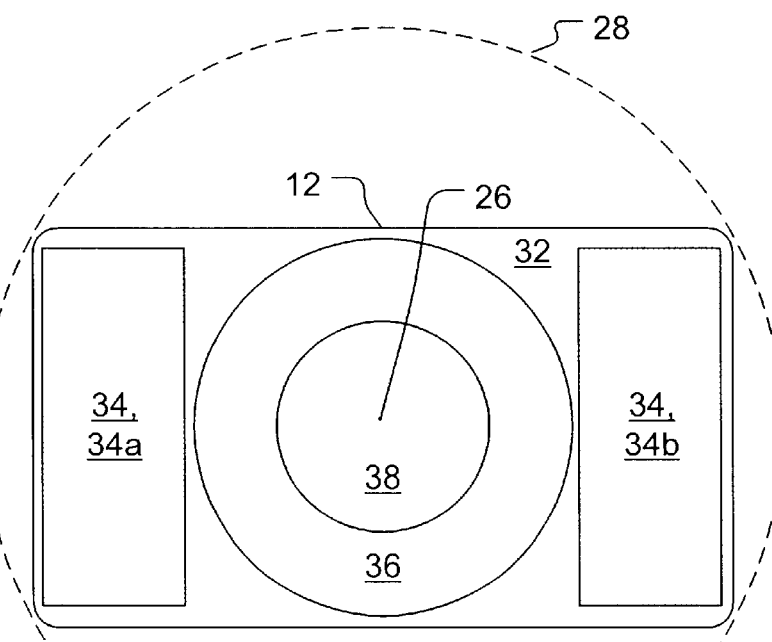

FIG. 2a–b present plan views of the information card 12. As can be seen particularly in FIG. 2a, a front surface 18 of the information card 12 may closely resemble a conventional business card or calling card. The front surface 18 may be marked with humanly visible indicia 20 such as a person's name and title, the company they represent, and an address and contact data. Machine readable indicia may also be added to the front surface 18 of the information card 12, e.g., bar coding, opto-reflective foil, etc. However, if the information card 12 is to be used as an enhanced business card, care should be taken to not unduly detract from its human visual communication role.

The preferred dimensions and shape of the information card 12, particularly when it is used with the rotary reader 14b, are nominally the same as those of conventional business cards. The front surface 18 may therefore be defined for discussion as having a face width 22, a face height 24, and a central axis 26 (normal to the drawing page). The thickness of the information card 12 may also be nominally that of a conventional business card.

The information card 12 can be constructed of any material suitable for marking with the visible indicia 20 and magnetic zones (described presently). The material used desirably has adequate stiffness and durability for repeated linear swiping of the information card 12 through the linear reader 14a, and for rotation of it within the cartridge 16. The material also may be chosen to be inexpensive, thus making the information card 12 economical and even disposable. Accordingly, paper and plastic materials make excellent substrates for the information card 12.

A circular boundary 28 (dashed line) is shown centered on the central axis 26, to represent the size of a conventional 3.5" floppy diskette. When the information card 12 is mounted into the cartridge 16 and rotated therein, much in the manner of such a diskette, the circular boundary 28 represents a constraint on the size of the information card 12. To increase the face width 22 and face height 24, and thus increase the effective usable area of the front surface 18 (and also the back surface), the corners 30 of the information card 12 may be rounded as shown in FIGS. 2a–b.

FIG. 2b depicts a back surface 32 of the information card 12 of FIG. 2a. Two stripe zones 34, a ring zone 36, and a contact area 38 are depicted on the back surface 32 of the information card 12 in this particular example. These are all clearly visually demarcated in FIG. 2b, but that is merely for emphasis to facilitate understanding here. The stripe zones 34 and the ring zone 36 are magnetically readable and writable, but they need not be visually distinct from the rest of the back surface 32. Similarly, the contact area 38 has a functional purpose that does not require it to be visually distinct. In fact, in the manner of some business cards, the same or additional visible indicia as appears on the front surface 18 may also appear on the back surface 32.

Another option is to make the entire back surface 32 of the information card 12 one large magnetic media region, or a large single media region aside from the contact area 38. When this is done the stripe zones 34 and the ring zone 36 may be writable/readable regions within the single magnetic media region. Making the zones 34, 36 the contact area 38 distinct and visible has the benefit, however, of permitting users of the information card 12 to readily and intuitively recognize it as distinct from mere conventional business cards.

A left stripe zone 34a and a right stripe zone 34b are shown in FIG. 2b. However, only one of these may be present, or both may be present. Providing and using multiple stripe zones 34 can, however, provide various benefits. For instance, the same data can be stored in each stripe zone 34 and if one is damaged another may still be usable. Using multiple stripe zones 34 also provides more data storage capacity. For example, the same data may be stored in different stripe zones 34 in different formats, e.g., data in the left stripe zone 34a may be encoded in English and data in the right stripe zone 34b may be encoded in Japanese. Or different magnetic formats may be supported by different stripe zones 34 to permit multiple types of linear readers 14a to read the information card 12.

The stripe zones 34 shown in FIG. 2b are placed at the width-wise opposed edges of the information card 12, but this is also not a requirement. By reducing the diameter of the ring zone 36 enough space can be made to put stripe zones 34 along the height-wise opposed edges of the card. This can be instead of or even in addition to the left and right stripe zones 34 shown in FIG. 2b, i.e., the information card 12 may have as many as four stripe zones 34.

The ring zone 36 is desirably centered about the central axis 26, and thus also centrally on the back surface 32. This permits writing and reading data stored in the ring zone 36 by rotating the information card 12 in the manner of a disk. In fact, the ring zone 36 may particularly be made format compatible with a conventional 3.5" floppy disk drive. This will be described further with discussion of the cartridge 16, below.

The inventors anticipate that in many embodiments the stripe zones 34 and the ring zone 36 will contain the same data as appears in the humanly visible indicia 20. However, due to the inherently large storage capacity provided by the size of the zones 34, 36 and the nature of magnetic media, much more data may be stored in the zones 34, 36 than in the humanly visible indicia 20. The stripe zones 34 and the ring zone 36 may contain the same data, all or in part, but this is merely a matter of choice and is not a requirement or limitation.

The contact area 38 is centrally located in the back surface 32 of the information card 12. Its purpose is to receive contact with a hub in the cartridge 16, which is in turn driven by a spindle in the rotary reader 14b. For this reason the contact area 38 desirably has an appreciable friction or adhesion to facilitate positive engagement with the hub. The inherent nature of the material used for the information card 12 may provide for suitable engagement, or the contact area 38 may be treated to provide such, e.g., by roughening it or by coating it with an adhesive. The contact area 38 may, optionally, be retreated slightly from the overall plane of the back surface 32. This can help when stacking many of the information cards 12 together, and can minimize their sticking together if the contact area 38 is adhesive.

Figure 3:
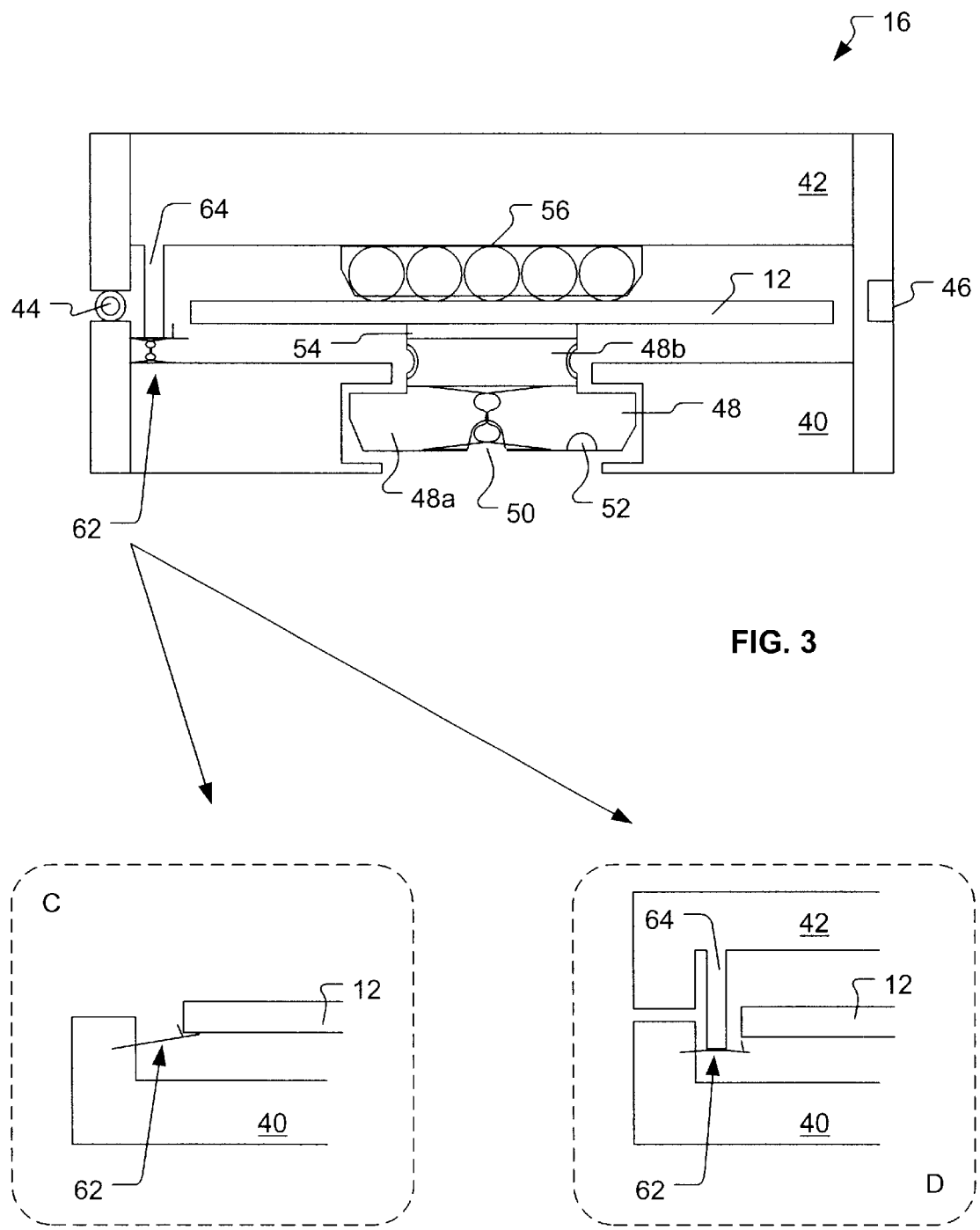
FIG. 3 is a side elevational view of a cartridge according to the present invention.

FIG. 3 is a side elevational view of a cartridge 16 which is suitable for use in the inventive data distribution system 10. The cartridge 16 carries one information card 12 and may be used to access data stored in the ring zone 36 with a rotary reader 14b (FIG. 1). The preferred rotary reader 14b is a conventional 3.5" floppy disk drive. The dimensions of the cartridge 16 may therefore be roughly the same as a conventional 3.5" floppy diskette cartridge. In FIG. 3 the vertical dimensions are somewhat exaggerated to distinguish the respective components and their relationships. The cartridge 16 may also be made stronger, for functional and durability purposes, than a conventional 3.5" floppy diskette cartridge, say, by using metal parts in all or part of its construction.

The cartridge 16 has a bottom cover 40 and a top cover 42 which are attached together at one side by a hinge 44. This permits the cartridge 16 to open and close in a clamshell-like manner. A latch 46 is provided opposite the hinge 44, to permit locking the cartridge 16 closed, as it is depicted in FIG. 3.

The bottom cover 40 includes a rotatably movable hub 48. The preferred hub 48 has a lower part 48a and an upper part 48b. When the cartridge 16 is loaded into a rotary reader 14b (FIG. 1) this permits a spindle to extend upward and engage with the lower part 48a of the hub 48, in essentially the same manner as would be the case with the center hub of a floppy disk inside a diskette cartridge. To facilitate self-alignment of the hub 48 with the spindle, the bottom surface of the hub 48 may include a centrally located alignment cup 50. The bottom surface of the hub 48 may also include a pin opening 52 to permit a pushpin in the floppy disk drive to enter and positively rotate the hub 48.

The upper part 48b of the hub 48 has a flat engagement area 54 on top which is suitable to engage with the contact area 38 of an information card 12. As is the case for the contact area 38, this engagement area 54 may have a friction or adhesion property chosen to facilitate positive engagement with the contact area 38.

The top cover 42 of the cartridge 16 includes a centrally located bearing unit 56. When the cartridge 16 is closed, a contained information card 12 rests atop the engagement area 54 on the hub 48 and beneath, typically in light contact with, the bearing unit 56. The preferred bearing unit 56, depicted in FIG. 3 as including a set of small ball bearings, permits full rotational and some lateral movement of the information card 12 within the cartridge 16. The information card 12 is thus movable and self-aligning within the cartridge 16 as it closes.

When the cartridge 16 is loaded into the rotary reader 14b (floppy disk drive), upward engagement of the spindle with the hub 48 raises it such that the engagement area 54 and the contact area 38 mate and the information card 12 is trapped. The bearing unit 56 permits further self-aligning of the information card 12 within the cartridge 16 as this occurs. In particular, however, the main role of the bearing unit 56 is to permit driven rotation of the information card 12 with force applied via the hub 48 from the spindle of the rotary reader 14b.

Figure 4:
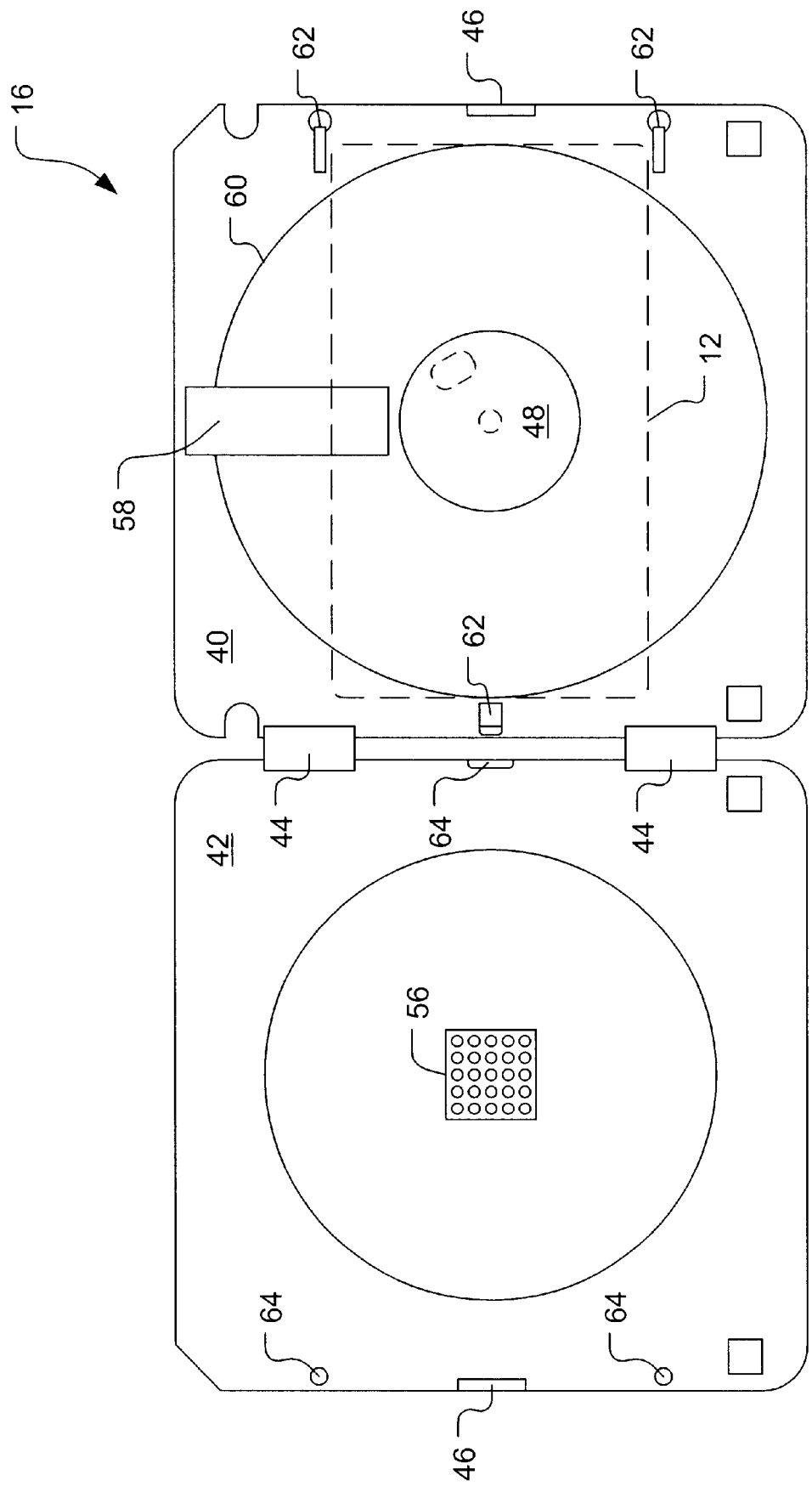
FIG. 4 is a top plan view of the cartridge of FIG. 3 in an open state.

FIG. 4 is a top plan view of the cartridge 16 in an open state without an information card 12 mounted (where one would lie is depicted in ghost outline). The bottom cover 40, the top cover 42, the hinge 44, the latch 46, and the hub 48, are again shown.

The bottom cover 40 includes a port 58 by which a read (and/or write) head in the rotary reader 14b may be brought close to and read data in the ring zone 36 (FIG. 2b) of an information card 12, in essentially the same manner the read/write read of a conventional floppy disk drive is able to access a floppy diskette. The bottom cover 40 may also, optionally, includes a cleaning liner 60 to remove contamination that might otherwise reach the read head of the rotary reader 14b. The cleaning liner 60 can be shaped smaller, the size of ring zone 36, and to accommodate the alignment guides (described presently). Otherwise, the cleaning liner 60 may generally be the same as conventional cleaning liners used in conventional floppy disk cartridges. Typically it will be a low-lint cloth-like material which the media surface lightly rides upon so that contamination is deposited into the cloth material. In floppy disk cartridges cleaning liners are used both above and below the media disk, for support and because both side of the media disk may bear information and carry contamination. A second cleaning liner may be provided and used in the top cover 42 of the cartridge 16, as well, but this will not generally be necessary because the information cards 12 have only the one, lower, magnetically readable side and are much more rigid than conventional, appropriately named, "floppy" diskettes.

The bottom cover 40 further includes alignment guides 62, against which an information card 12 can be abutted as it is loaded by a user. Three such alignment guides 62 are shown but more or less can be used. With brief reference back to FIG. 3 as well, the alignment guides 62 protrude upward when the cartridge 16 is open, but are pressed downward and out of the way by depressors 64 in the top cover 42 as the cartridge 16 is closed. FIG. 3 depicts how the alignment guides 62 and depressors 64 may engage and operate in this manner.

In FIG. 3, an insert C shows a preferred embodiment of the alignment guides 62 and depressors 64 in operation when the cartridge 16 is open, while an insert D shows operation when the cartridge 16 is closed. As can be seen in inserts C–D, one very simple approach is to use alignment guides 62 which springably protrude upward and engage with the information card 12 to align it when the cartridge 16 is open, yet which are springably depressed downward by the depressors 64 and disengage from the information card 12 when the cartridge 16 is closed.

In summary, the information card 12 can be manually "swiped" through a linear reader 14a to read data magnetically stored in one or more stripe zones 34 of the information card 12. This may be substantially the same as is done for reading conventional credit card magnetic strips. Alternately, the information card 12 can be loaded into the cartridge 16, which is in turn loaded into the rotary reader 14b. The rotary reader 14b is then able to read data magnetically stored in the ring zone 36 of the information card 12 in essentially the same manner hat it can read data from a conventional floppy disk.

The stripe zones 34, and in the ring zone 36 may store the data magnetically in any appropriate format which the reader 14 can handle. For instance, the data may simply be stored encoded in ASCII, if desired, and error checking and correcting codes may be used. Multiple encodings of the data in entirely different formats are possible concurrently.

As previously noted, the stripe zones 34 and the ring zone 36 typically will contain a superset of the data present in humanly visible indicia 20 on the front surface 18 of the information card 12. This may be as a machine readable encoded version of the data, and pictures, trademark drawings, corporate logos, etc. can even be included as digital image data. Alternately, or more typically additionally, the entire front surface 18 may be provided as a magnetically stored image.

The stripe zones 34 and in the ring zone 36 may optionally also store data identifiers. While card scanners and optical character recognition have long been available, the problem of identifying the data which is provided in a medium like a business card remains. Using data identifiers, the information card 12 can facilitate data recognition, categorization, and storage, particularly into databases. For example, both the stripe zones 34 and the ring zone 36 of an information card 12 may include the following ASCII text:

PersonName: Dr. John Tsai;
Title: President;
Telephone: 1.408.727.4260;
Fax:;
e-mail: johnt@excelprecision.com;
CompanyName: Excel Precision Corporation;
CompanyAddress: . . . , CompanyIncorporation: California, USA; . . . ;
CompanyMainOffice: Santa Clara, Calif., USA;
CompanySalesOffices(4) Singapore; Tokyo, Japan; Paris, France; . . . , etc.

When such an information card 12 is read with a reader 14, the data can be entered into a new database record with fields corresponding to the data identifiers, automatically or after user approval. If a database has not been provisioned to include a company's location of incorporation, say, because such is unimportant to the purpose of the database, this datum can simply be ignored. Similalry, if the database has a field for "CellularPhone:" the information card 12 does not have to include data for this (e.g., the Fax filed is empty in the above axample). Furthermore, with data identifiers, the ordering of data becomes irrelevant. The fact that "CompanyIncorporation" precedes "CompanyMainOffice" need have no effect on properly reading the data into a database.

In appropriate devices, or with appropriate software which are able to work with the reader 14, data identifiers in information cards 12 can be used to automatically initiate actions. A cellular telephone unit with a linear reader 14a can read the contents of a data field "Telephone: . . . " and either automatically dial immediately or store the number for later "speed dial" type use. A personal digital assistant with a linear reader 14a can automatically create a new contact entry and populate it with data from an information card 12 which has been read. Upon loading of a cartridge 16 containing an information card 12, a networked personal computer with a rotary reader 14b can open and address a new e-mail to the contents of "e-mail: . . . " field. Alternately, with a mapping application the personal computer can automatically use "ComapnyGPSData: . . . " to generate a map of the area around a company's office, or to print out driving instruction to a location described in such a field. Of course, storage capacity permitting, the information card 12 itself might contain a map and even general driving instructions, but many will want the flexibility which Global Positioning System (GPS) data can provide and the inventive data distribution system 10 can accommodate this.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present data distribution system 10 is well suited for application in our modern, highly automated world. The system retains the advantages of human visually-readable media and adds the advantages of magnetic machine-readability. The data stored and distributed may include, all or in part, the human visually-readable indicia on its information card media, or it may have totally different visible and magnetic content. Furthermore, the magnetic content may include data encoded in multiple machine readable formats and in multiple human languages.

In particular, the invention adopts and extends upon the conventional business or calling card. The information card media used may chosen to intentionally resemble such conventional cards, but employ and expand on the conventional role of these. Users can be expected to readily appreciate the information card as identifying and providing important information about its presenter and yet, particularly if the functional features of the back surface are made visually apparent, also intuitively appreciate that the information card provides the same or additional information in machine readable format. Yet for all the additional benefits with the information card media permits, it need not appreciably increase the cost over conventional cards. The information card media may be inexpensive and readily disposable, just as conventional cards are.

Unlike conventional cards, the information card is machine readable. this permits its data to be readily employed, even automatically. The optional use of recorded data identifiers allows the data to be stored in databases or contacts listings, and can cause telephone numbers, GPS data, etc. to be acted upon immediately to deal a telephone device (including pagers, facsimile machines, and other such devices) or to provide a map or route information.

The readers used by the invention also may be quite flexible, and employ widely available and economical technology. Both linear and rotary type reading machines may be used. Suitable liner readers are already in wide use by merchants, and with suitable incentive may readily be adopted by individuals as well. Small, inexpensive linear readers may be incorporated into a wide range of common and emerging devices, and thus permit use of the information card and obtaining the benefits of the present invention. For example, the user of a cell phone with an installed linear reader may simply swipe an information card through the reader and have one or more telephone numbers added to a speed dial database or even one dialed automatically. And similar examples of using information cards with PDAs and GPS devices have also been presented herein.

Rotary type reading mechanisms are widely used today, including considerable use by individuals. The invention may employ specialized rotary mechanisms, or extend upon and use conventional ones. Common computer systems today almost always have at least on removable media drive unit, typically a 3.5" floppy disk drive. The present invention may employ a mounting cartridge in which the information card is mounted and then loaded into such a floppy disk drive for reading and writing the data. Furthermore, such mounting cartridges can themselves be quite economical, as the low coast of floppy diskette cartridges evidences. The mounting cartridges can also be made of durable material, if desired.

For the above, and other, reasons, it is expected that the data distribution system 10 of the present invention will have widespread industrial applicability. Therefore, it is expected that the commercial utility of the present invention will be extensive and long lasting.

What is claimed is:

1. A system for distributing data, comprising:

an information card having a front surface, a back surface, and four edges defining a rectangular shape such that said information card resembles a conventional business card;

said information card having upon its said front surface visually-recognizable indicia resembling said conventional business card;

said information card having upon its said back surface at least one stripe zone and a ring zone, wherein said at least one of said stripe zones and said ring zone are suitable for containing magnetically recorded instances of the data;

said stripe zones being aligned parallel with opposed said edges of said information card and being readable with respect to the data recorded therein by passing said information card through a linear read mechanism;

said ring zone being centered about a central axis through said information card with respect to said edges and being readable with respect to the data recorded therein by passing said information card through a rotational read mechanism; and a reader for reading the data magnetically recorded in said information card, wherein said reader contains at least one member of a set consisting of said linear read mechanisms and said rotational read mechanisms.

2. The system of claim 1, wherein:

at least one of said stripe zones and said ring zone does contain the data and also includes data identifiers associated with at least some of the data; and said reader initiates an action automatically in response to reading specific instances of said data identifiers.

3. The system of claim 2, wherein:

said reader includes a database of records having a plurality of uniquely identified fields; and said action is storing instances of the data into said uniquely identified fields of said records when said data identifiers associated with the data match said uniquely identified fields.

4. The system of claim 2, wherein:

said reader includes a telephone device; and when the data includes a telephone number, said action is dialing said telephone number.

5. The system of claim 2, wherein:

said reader includes a global positioning system (GPS) device and a display unit; and when the data includes GPS data, said action is displaying a map or route based on said GPS data on said display unit.

6. An information card for distributing data, comprising:

a front surface, a back surface, and four edges defining a rectangular shape such that the information card resembles a conventional business card;

the information card having upon its said front surface visually-recognizable indicia resembling said conventional business card;

the information card having upon its said back surface at least one stripe zone and a ring zone suitable for containing magnetically recorded instances of the data;

said stripe zones being aligned parallel with opposed said edges of said information card and being readable with respect to recorded instances of the data by passing the information card through a linear read mechanism; and said ring zone being centered about a central axis through the information card with respect to said edges and being readable with respect to recorded instances of the data by passing the information card through a rotational read mechanism.

7. The information card of claim 6, wherein at least one of said stripe zones and said ring zone does contain the data.

8. The information card of claim 7, wherein the data includes encoded versions of at least some of said visually-recognizable indicia appearing upon said front surface of the information card.

9. The information card of claim 7, wherein said at least one of said stripe zones and said ring zone further includes data identifiers associated with at least some of the data.

10. The information card of claim 6, wherein the information card is constructed with a paper or plastic based substrate material, to facilitate economical manufacture of the information card.

11. The information card of claim 6, further comprising a contact area located within said ring zone and also centered about said central axis through the information card, to contact said rotational read mechanism when reading the information card.

12. The information card of claim 11, wherein said contact area has at least one member of a set of surface properties including high friction and adhesiveness, to positively maintain contact of said rotational read mechanism with the information card.

13. The information card of claim 12, wherein said contact area is retreated slightly from the plane of said back surface, to facilitate interlocking stacking of pluralities of the information card.

14. A system for distributing data, comprising:

an information card having a front surface, a back surface, and four edges defining a rectangular shape such that said information card resembles a conventional business card;

said information card having upon its said front surface visually-recognizable indicia resembling said conventional business card;

said information card having upon its said back surface at least one stripe zone and a ring zone, wherein said at least one of said stripe zones and said ring zone are suitable for containing magnetically recorded instances of the data;

said stripe zones being aligned parallel with opposed said edges of said information card and being linearly readable with respect to the data recorded therein;

said ring zone being centered with respect to said edges and being rotatably readable with respect to the data recorded therein;

a conventional floppy disk drive having a read head and a spindle with a central spindle axis;

a mounting cartridge for mounting said information card into said floppy disk drive to rotatably read the data magnetically recorded in said ring zone;

said mounting cartridge including a bottom cover, a top cover, a hinge hingably connecting said top and bottom covers, and a latch suitable for manually locking and unlocking said top and bottom covers together to contain said information card within said mounting cartridge;

said top and bottom covers having dimensions, when said mounting cartridge is hingably closed and latched, such that said mounting cartridge has dimensions equivalent to a conventional diskette cartridge;

a hub having an upper side, a lower side and a center hub axis, wherein said hub is centrally and rotatably mounted in said bottom cover, and said upper side is flat and substantially coplanar with said top and bottom covers when said mounting cartridge is closed, and said lower side is shaped to engage with said spindle of said floppy disk drive and thereby cause said center hub axis to become coaxial with said central spindle axis when said mounting cartridge is loaded into said floppy disk drive;

said top cover including a centrally located rotatable unit against which said information card is pressably held by said hub when it is engaged by said spindle of said floppy disk drive; and said bottom cover including a port permitting access by said read head to the data magnetically stored in said ring zone of said information card when said mounting cartridge with said information card mounted therein is loaded into said floppy disk drive.

* * * * *